(12) United States Patent
Lee

(10) Patent No.: US 7,355,639 B2
(45) Date of Patent: Apr. 8, 2008

(54) LENS CORRECTION USING PROCESSED YUV DATA

(75) Inventor: HoSeong Lee, Sunnyvale, CA (US)

(73) Assignee: OmniVision Technologies, Inc., Sunnyvale, CA (US)

( * ) Notice: Subject to any disclaimer, the term of this patent is extended or adjusted under 35 U.S.C. 154(b) by 706 days.

(21) Appl. No.: 10/758,385

(22) Filed: Jan. 13, 2004

(65) Prior Publication Data
US 2005/0099507 A1 May 12, 2005

(51) Int. Cl.
*H04N 9/64* (2006.01)
*G06K 9/40* (2006.01)

(52) U.S. Cl. ..................... 348/251; 382/274
(58) Field of Classification Search ........... 348/222.1, 348/241, 251, 615; 382/274, 275
See application file for complete search history.

(56) References Cited

U.S. PATENT DOCUMENTS

2001/0045988 A1* 11/2001 Yamauchi et al. ......... 348/273
2002/0135688 A1* 9/2002 Niikawa .................... 348/251
2002/0196472 A1* 12/2002 Enomoto .................. 358/3.26
2003/0156204 A1* 8/2003 Sato et al. .............. 348/222.1
2004/0012696 A1* 1/2004 Teratani et al. ............ 348/246

FOREIGN PATENT DOCUMENTS

JP          11250240 A    *  9/1999

* cited by examiner

*Primary Examiner*—Lin Ye
*Assistant Examiner*—Timothy J Henn
(74) *Attorney, Agent, or Firm*—Blakely Sokoloff Taylor & Zafman LLP (57) ABSTRACT

A lens correction is applied to image data by first converting the image data to a YUV color space, if the image data is not already in the YUV color space. Image processing procedures are applied to the image data in the YUV color space to form image processed YUV data. A corresponding correction value is then applied to each component, i.e., Y, U and V component, of the image processed YUV data.

44 Claims, 4 Drawing Sheets

LENS CORRECTION USING PROCESSED YUV DATA

TECHNICAL FIELD

The present invention relates to image sensors, and more particularly, to a lens correction method for use on the processed output of an image sensor.

BACKGROUND

Integrated circuit technology has revolutionized various fields, including computers, control systems, telecommunications, and imaging. In the field of imaging, the charge coupled device (CCD) has been made popular by its performance characteristics. Nevertheless, the solid state CCD integrated circuits needed for imaging are relatively difficult to manufacture, and therefore are expensive. In addition, because of the differing processes involved in the manufacture of the CCD integrated circuits relative to MOS integrated circuits, the signal processing portion of the imaging sensor has typically been located on a separate integrated chip. Thus a CCD imaging device includes at least two integrated circuits: one for the CCD sensor and one for the signal processing logic.

Another class of image sensors is the CMOS active pixel sensor. As noted in U.S. Pat. No. 5,625,210 to Lee et al. ("the '210 patent"), an active pixel sensor refers to an electronic image sensor with active devices, such as transistors, that are associated with each pixel. The active pixel sensor has the advantage of being able to incorporate both signal processing and sensing circuitry within the same integrated circuit because of the CMOS manufacturing techniques.

Because of the advances in image sensor technology, image sensors are now commonplace and are used in small form factor applications, such as personal digital assistants (PDAs) and cell phones. As the size of the image sensor and associated lens decreases, it has been found that increased aberration occurs. Aberration results in undesirable effects, such as shading, "dark corners", color differences, "reddishness", and vignetting.

Figure 1:
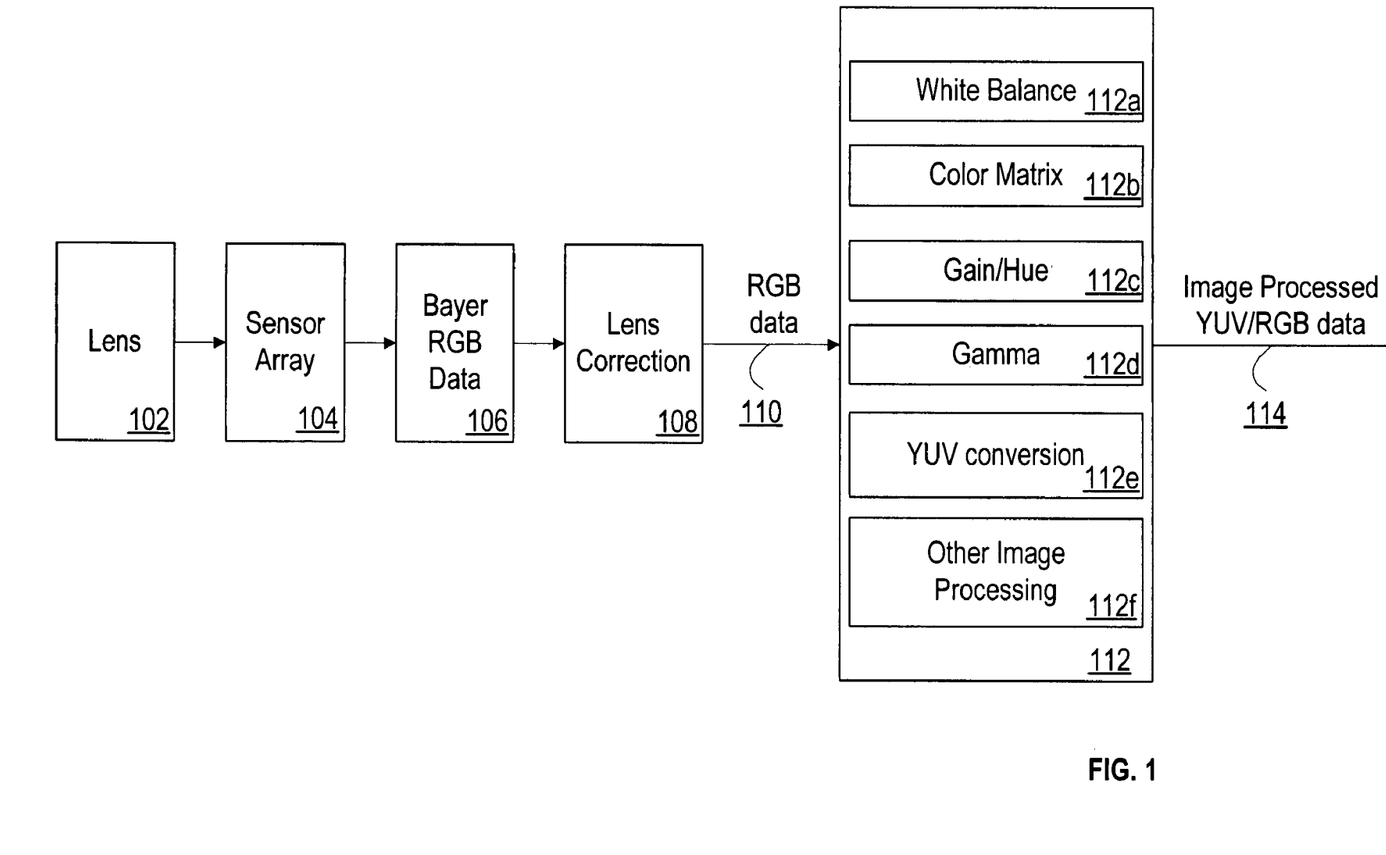
FIG. 1 is a schematic diagram that illustrates one approach for lens correction.

FIG. 1 shows one approach for attempting to correct some of the problems mentioned above. FIG. 1 shows lens 102, a sensor array 104 associated with an image sensor module (not shown), Bayer RGB data 106, a lens correction process 108, an RGB data output 110, image processing 112, and image processed YUV/RGB data 114. As shown in FIG. 1, the lens correction processing is performed on the raw RBG data output 110. Such an approach facilitates easy color control associated with control of automatic white balance 112a (AWB), color matrix 112b, color gain/hue 112c, color gamma correction 112d, YUV conversion 112e, and other image processing 112f.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

The present invention is a lens correction method and apparatus which can improve, enhance, or solve the shading effects of an image produced by a given lens, dark corner effects on the image, color differences between the center and corners of the image, and vignetting problems in various types of image sensors.

Figure 2:
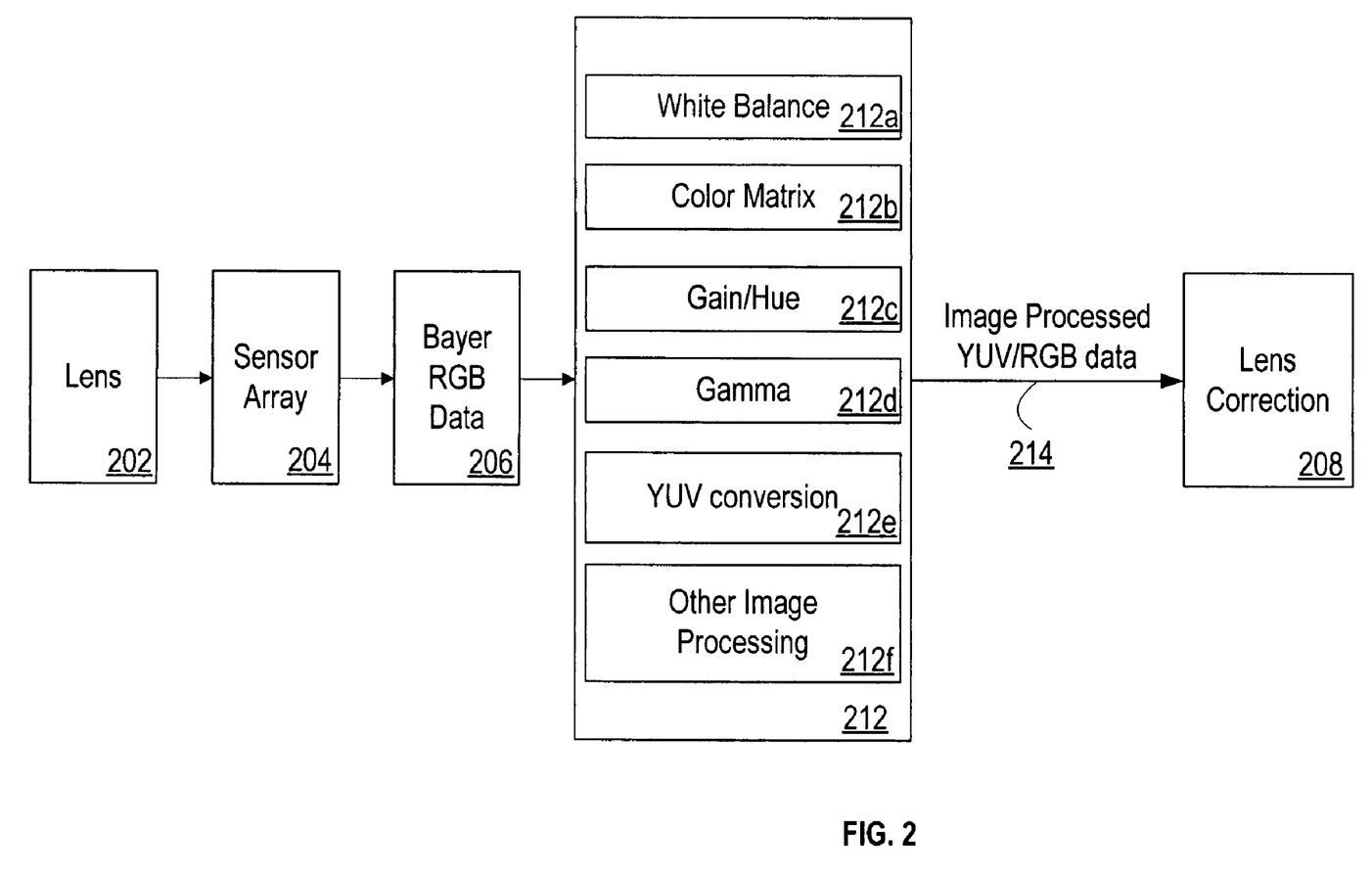
FIG. 2 is a schematic diagram that illustrates a process for lens correction in accordance with certain embodiments of the invention.

FIG. 2 is a schematic diagram that illustrates a process for lens correction in accordance with certain embodiments of the invention. In FIG. 2 shows a lens 202, a sensor array 204 associated with an image sensor module (not shown), Bayer RGB data 206, a lens correction process 208, image processing 212, and image processed YUV/RGB data 214. Image processing 212 comprises controls associated with automatic white balance 112a (AWB), color matrix 112b, color gain/hue 112c, color gamma correction 112d, YUV conversion 112e, and other image processing 112f. In FIG. 2, lens correction process 208 is applied to the image processed YUV data 214. As seen in FIG. 2, because certain embodiments of the invention use the image processed YUV data, there is no need to implement the lens correction method in the image sensor module. Instead, the lens correction method may be implemented on a digital signal processor (DSP), a backend processor, or an image processor. The lens correction method can be implemented by software on a general purpose central processing unit (CPU) or microprocessor or by a combination of software and hardware.

In the following description, numerous specific details are provided to provide a thorough understanding of the embodiments of the invention. One skilled in the relevant art will recognize, however, that the invention can be practiced without one or more of the specific details, or with other methods, components, etc. In other instances, well-known structures or operations are not shown or described in detail to avoid obscuring aspects of various embodiments of the invention.

Reference throughout the specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout the specification are not necessarily all referring to the same embodiment. Furthermore, the particular features, structures, or characteristics may be combined in any suitable manner in one or more embodiments.

Figure 3:
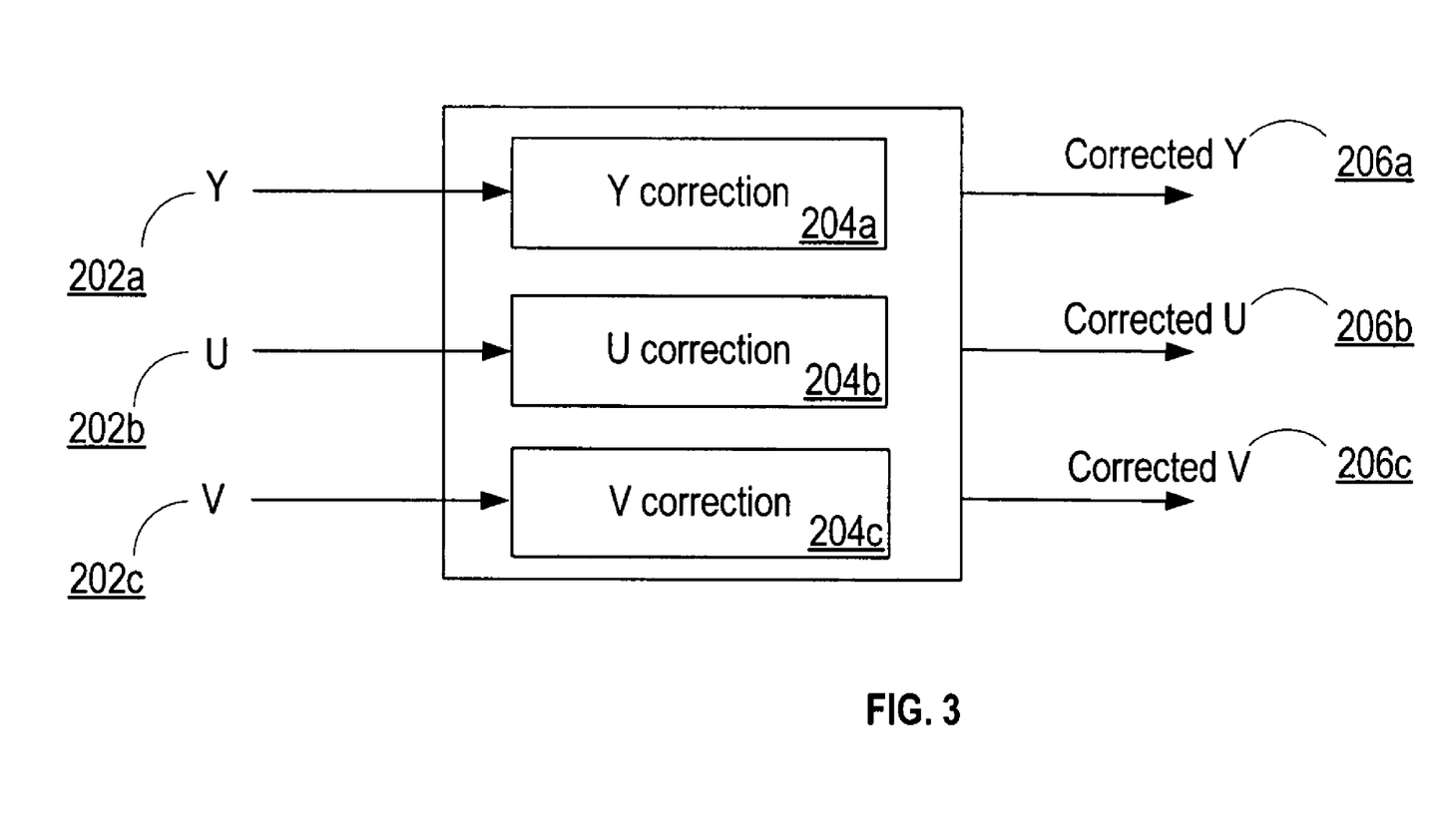
FIG. 3 is a schematic diagram illustrating that the lens correction is performed on the YUV data in accordance with certain embodiments of the invention.

As noted above, certain embodiments of the invention operate in the YUV color space (domain). FIG. 3 is a schematic diagram illustrating that the lens correction is performed on the YUV data in accordance with certain embodiments of the invention. FIG. 3 shows that a Y correction value 204a is applied to the Y data 202a to result in a corrected Y data 206a. Similarly, a U correction value 204b is applied to the U data 202b to result in a corrected U data 206b. A V correction value 204c is applied to the V data 202c to result in a corrected V data 206c.

The equations presented herein are merely illustrative and may vary from implementation to implementation. In simple terms, certain embodiments correct each component of the image data in the YUV domain in accordance with:

Corrected $Y = Y * YGain$                    Equation 1

Corrected $U = U + DeltaU$                   Equation 2

Corrected $V = V + DeltaV$                   Equation 3 where,
YGain is the Y correction value
DeltaU is the U correction value
DeltaV is the V correction value For purposes of explanation, any pixel to which a correction value (either Y, U or V correction value) is to be applied is referred to herein as the target pixel. According to certain embodiments, the Y, U and V correction values are based on the distance of the target pixel relative to the center of the reference image.

According to certain embodiments, the U correction value is based on a first distance value. Such a U correction value is bounded by a minimum and a maximum U correction limit, which are constants. The minimum and maximum U correction limits may be user-selected based on properties of the lens. The user may select such minimum and maximum U correction limits so that the resulting U correction value is neither insufficient nor excessive when applied to a given target pixel.

With respect to the first distance value, assume that the pixels in the reference image trace a set of imaginary concentric rings emanating from the center of the reference image. The same U correction value is applied to each pixel (target pixel) on a given ring. In such a case, the distance value may be determined by a function defined by Equation 10 below, as an example.

According to yet another embodiment, the first distance value may be defined by assuming that the pixels in the reference image trace a set of imaginary concentric rhombuses (diamond shape) emanating from the center of the reference image. The same U correction value is applied to each pixel (target pixel) on a given rhombus. In such a case, the distance value may be determined by a function defined by Equation 11 below, as an example.

According to another embodiment, the first distance value may be defined by assuming that the pixels in the reference image trace a set of imaginary concentric rectangles emanating from the center of the reference image. The same U correction value is applied to each pixel (target pixel) on a given rectangle. In such a case, the distance value may be determined by a function defined by Equation 12 below, as an example.

According to another embodiment, the first distance value may be defined by assuming that the pixels in the reference image trace a set of imaginary concentric polygons that are approximately ring-shaped and emanating from the center of the reference image. The same U correction value is applied to each pixel (target pixel) on a given polygon. In such a case, the distance value may be determined by a function defined by Equations 13a, 13b, 13c and 13d below, for example. Such polygons are intended to be approximations of the concentric rings of Equation 10. The polygons of Equations 13a, 13b, 13c and 13d are twelve-sided. However, the embodiments are not restricted to twelve-sided polygons. The greater the number of sides to a given polygon, the closer the approximation to a ring. Thus, the level of approximation to a ring can be user-selected.

Further, the U correction value may either be increased in decreased by a luminance parameter that is related to the Y value of the target pixel. Such a luminance parameter is user-selected based on whether the Y value of the target pixel satisfies certain luminance-related conditions. The luminance-related conditions associated with the U correction value may be defined by Equations 8a, 8b, and 8c below, for example.

Thus, based on the above description, the U correction value, namely, DeltaU, may be defined by Equation 5 below, as an example, according to certain embodiments.

According to certain embodiments, the V correction value is based on a first distance value. Such a V correction value is bounded by a minimum and a maximum V correction limit, which are constants. The minimum and maximum V correction limits may be user-selected based on properties of the lens. The user may select such minimum and maximum V correction limits so that the resulting V correction value is neither insufficient nor excessive when applied to a given target pixel.

With respect to the first distance value, assume that the pixels in the reference image trace a set of imaginary concentric rings emanating from the center of the reference image. The same V correction value is applied to each pixel (target pixel) on a given ring. In such a case, the distance value may be determined by a function defined by Equation 10 below, as an example.

According to yet another embodiment, the first distance value may be defined by assuming that the pixels in the reference image trace a set of imaginary concentric rhombuses (diamond shape) emanating from the center of the reference image. The same V correction value is applied to each pixel (target pixel) on a given rhombus. In such a case, the distance value may be determined by a function defined by Equation 11 below, as an example.

According to another embodiment, the first distance value may be defined by assuming that the pixels in the reference image trace a set of imaginary concentric rectangles emanating from the center of the reference image. The same V correction value is applied to each pixel (target pixel) on a given rectangle. In such a case, the distance value may be determined by a function defined by Equation 12 below, as an example.

According to another embodiment, the first distance value may be defined by assuming that the pixels in the reference image trace a set of imaginary concentric polygons that are approximately ring-shaped and emanating from the center of the reference image. The same V correction value is applied to each pixel (target pixel) on a given polygon. In such a case, the distance value may be determined by a function defined by Equations 13a, 13b, 13c and 13d below, for example. Such polygons are intended to be approximations of the concentric rings of Equation 10. The polygons of Equations 13a, 13b, 13c and 13d are twelve-sided. However, the embodiments are not restricted to twelve-sided polygons. The greater the number of sides to a given polygon, the closer the approximation to a ring. Thus, the level of approximation to a ring can be user-selected.

Further, the V correction value may either be increased in decreased by a luminance parameter that is related to the Y value of the target pixel. Such a luminance parameter is user-selected based on whether the Y value of the target pixel satisfies certain luminance-related conditions. The luminance-related conditions associated with the V correction value may be defined by Equations 9a, 9b, and 9c below, for example.

Thus, based on the above description, the V correction value, namely, DeltaV, may be defined by Equation 6 below, as an example, according to certain embodiments.

According to certain embodiments, the Y correction value is based on is based on a second distance value. Such a Y correction value is bounded by a minimum and a maximum Y correction limit, which are constants. The minimum and maximum Y correction limits may be user-selected based on properties of the lens. The user may select such minimum and maximum Y correction limits so that the resulting Y correction value is neither insufficient nor excessive when applied to a given target pixel.

With respect to the second distance value, the second distance value is based on the first distance value (as previously described above), which in turn is augmented by user-selected constants. Such user-selected constants are based on the F value of the lens that is being corrected. The second distance value may be defined by Equation 14 below, as an example, according to certain embodiments.

Further, the Y correction value is based on a smoothing parameter, referred to herein as an alpha function. For purposes of explanation, assume that the Y correction can be represented by a curve that has a discontinuous point at the lower limit of the Y correction curve (see Equation 4 below). The alpha function is such that it has the effect of smoothing out the discontinuous point at the lower limit of the Y correction curve. The smoothing parameter may be defined by Equation 7 below, as an example, according to certain embodiments. C1 is the location associated with the discontinuous point at the lower limit of the Y correction curve. C3, C4 and C5 are selected by the user and depend upon the degree of smoothing that is desired.

Thus, based on the above description, the Y correction value, namely, YGain, may be defined by Equation 4 below, as an example, according to certain embodiments.

The following variables and functions are defined as follows:

x: horizontal coordinate of a pixel
y vertical coordinate of a pixel
Y: luminance value of a pixel
U: U value of a pixel, (i.e., chrominance U=Blue−Y)
V: V value of a pixel, (i.e., chrominance V=Red−Y)
YGain=Function_YGain(x,y)
DeltaU=Function_DeltaU(x,y,U)
DeltaV=Function_DeltaV(x,y,V)

where:

$$YGain = Function\_YGain(x, y)$$
$$= min(YMAXLIMIT, max(YMINLIMIT,$$
$$Function\_Distance\_two(x, y) *$$
$$YCOEFF + YOFFSET)) + Alpha \quad \text{Equation 4}$$

$$DeltaU = Function\_DeltaU(x, y, Y)$$
$$= min(UMAXLIMIT, max(UMINLIMIT,$$
$$Function\_Distance(x, y) * UCOEFF +$$
$$UOFFSET))/uGain(Y) \quad \text{Equation 5}$$

$$DeltaV = Function\_DeltaV(x, y, Y)$$
$$= min(VMAXLIMIT, max(VMINLIMIT,$$
$$Function\_Distance(x, y) *$$
$$VCOEFF + VOFFSET))/vGain(Y) \quad \text{Equation 6}$$

Alpha:
assume Ytemp_gain=abs(min(YMAXLIMIT, max(YMINLIMIT, Function_Distance(x,y)*YCOEFF+YOFFSET))
if(abs(Ytemp_gain−c1)<c2)

$$Alpha=(c3-abs(Ytemp\_gain-c4))/c5; \quad \text{Equation 7}$$

| | | | |
|---|---|---|---|
| uGain(Y): | | | |
| if (Y > c6) | uGain(Y) = c7 | | Equation 8a |
| else if (Y < c8) | uGain(Y) = c9 | | Equation 8b |
| else | uGain(Y) = c16 | | Equation 8c |
| vGain(Y): | | | |
| if (Y > c10) | vGain(Y) = c11 | | Equation 9a |
| else if (Y < c12) | vGain(Y) = c13 | | Equation 9b |
| else | vGain(Y) = c17 | | Equation 9c | where:

c1, c2, c3, c4, c5, c6, c7, c8, c9, c10, c11, c12, c13, c16, c17 are constants.

YMINLIMIT: constant value

YMAXLIMIT: constant value

UMINLIMIT: constant value

UMAXLIMIT: constant value

VMINLIMIT: constant value

VMAXLIMIT: constant value

YOFFSET : offset value

UOFFSET offset value

VOFFSET : offset value

YCOEFF: coefficient value

UCOEFF: coefficient value

VCOEFF: coefficient value

Note that the specific values for the constants and coefficients above depend upon the specific lens/image sensor combination. In general, these constants and coefficients are obtained through experimental observations of a reference image obtained from the lens/image sensor combination and can be selected by the user based on such observations.

Figure 4:
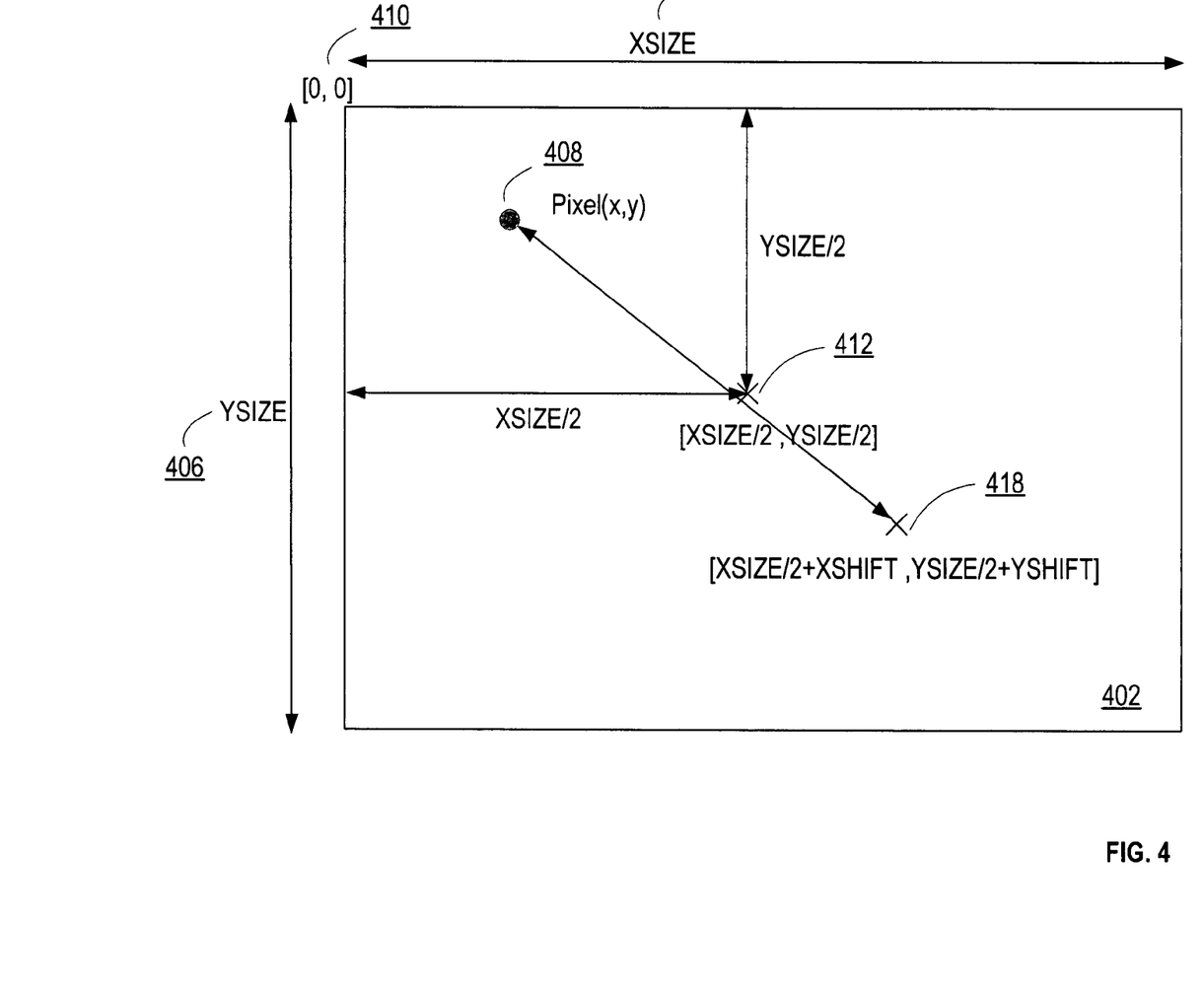
FIG. 4 is a diagram that illustrates a set of coordinates used in the correction method according to certain embodiments of the invention.

FIG. 4 is a diagram illustrating a set of coordinates used in the correction method according to certain embodiments of the invention. FIG. 4 shows a reference image 402 with length 404 (XSIZE) in the X direction, height 406 (YSIZE) in the Y direction. Reference image 402 is associated with a coordinate system having an origin [0,0] at location 410. The center of reference image 402 is at location 412 with coordinates [XSIZE/2, YSIZE/2]. The location of pixel 408 may be described with reference to location 412. The location of pixel 408 may also be described with reference to an arbitrary location such as location 418 with coordinates [XSIZE/2+XSHIFT, YSIZE/2+YSHIFT]. XSHIFT and YSHIFT represent the distances from location 412 in the X and Y direction, respectively.

Let

HalfX=XSIZE/2

HalfY=YSIZE/2

Dx=abs(HalfX−x+XSHIFT)

Dy=abs(HalfY−y+YSHIFT)

NormalizeValue is a value that depends on whether the implementation is an 8 bit or 16 bit etc., implementation. For example, for an 8 bit implementation, the NormalizeValue is a value which make the range of the final result of each of the equations 10, 11, 12, 13a, 13b, 13c, 13d from 0~255, wherein $2^8-1=255$ The Function_Distance(x,y) can be one of the following equations or other equivalent Distance function.

$$\text{Function\_Distance}(x, y) = \text{Root}(Dx * Dx + Dy * Dy) * \text{NormalizeValue} \quad \text{Equation 10}$$

or $$\text{Function\_Distance}(x, y) = (Dx + Dy) * \text{NormalizeValue} \quad \text{Equation 11}$$

or $$\text{Function\_Distance}(x, y) = \max(Dx, Dy) * \text{NormalizeValue} \quad \text{Equation 12}$$

or

If $(Dx > (Dy<<2))$ then, $$\text{Function\_Distance}(x, y) = (Dx + Dy + \max(Dx, Dy) + (\text{abs}(Dx - (Dy<<2))>>3))) * \text{NormalizeValue} \quad \text{Equation 13a}$$

Else if $(Dy > (Dx<<2))$ then, $$\text{Function\_Distance}(x, y) = (Dx + Dy + \max(Dx, Dy) + (\text{abs}(Dy - (Dx<<2))>>3)) * \text{NormalizeValue} \quad \text{Equation 13b}$$

Else if $(\max(Dx, Dy) > (\text{abs}(Dx - Dy)<<2))$ then, $$\text{Function\_Distance}(x, y) = (Dx + Dy + \max(Dx, Dy) + (\max(Dx, Dy) - (\text{abs}(Dx - Dy)<<2))>>3)) * \text{NormalizeValue} \quad \text{Equation 13c}$$

Else $$\text{Function\_Distance}(x, y) = (Dx + Dy + \max(Dx, Dy)) * \text{NormalizeValue} \quad \text{Equation 13d}$$

where, "<<2" means multiply 4, and ">>3" means divide by 8.

The various equations set forth above are alternative embodiments that have various implementation advantages/disadvantages. For example, Equation 10 is not as easy to implement in hardware (cost will be high) and it require more calculation resources in software. However, the resultant image for Equation 10 is relatively good.

Equation 11 is easy to implement in hardware (cost will be low) and it requires relatively small computational resources in software. However, the resultant image is not as good as that of Equation 10.

Equation 12 is easy to implement in hardware (cost will be low) and it requires relatively small computational resources in software. However, the resultant image is not as good as that of Equation 10.

Finally, Equations 13a, 13b, 13c, 13d are easy to implement in hardware (cost will be low) and it requires low amounts of computational resources in software. Further, the resultant image is good.

Assume:

Distance=Function_Distance(x,y)

$$\text{Function\_Distance\_two}(x, y) = \text{Distance} - \max(0, (Y - (c14 - \text{Distance}/c15))) \quad \text{Equation 14}$$

where:

c14, c15 are constants and can be selected by the user based on the F value of the lens for which lens correction is to be applied.

Max(a, b): Taking a bigger value between a and b

Min(a, b): Taking a smaller value between a and b

I claim:

1. A method for applying a lens correction to image data that is associated with a lens, the method comprising:
    converting the image data to a YUV color space to form YUV image data, if the image data is not in the YUV color space;
    applying image processing procedures to the YUV image data to form image processed YUV data; and
    applying the lens correction to the image processed YUV data, wherein applying the lens correction includes applying a U correction value to a U component of the image processed YUV data, the U correction value is based at least in part on a luminance parameter, and the luminance parameter is determined based on whether the Y component of the image processed YUV data falls within a pre-selected luminance range.

2. The method of claim 1, wherein applying the lens correction further comprises:
    applying a Y correction value to a Y component of the image processed YUV data; and
    applying a V correction value to a V component of the image processed YUV data.

3. The method of claim 1, wherein applying the lens correction further comprises:
    multiplying a Y component of the image processed YUV data by a Y correction value;
    adding a U component of the image processed YUV data to the U correction value; and
    adding a V component of the image processed YUV data to a V correction value.

4. The method of claim 2, wherein the U correction value is based on a first distance value, wherein the first distance value is associated with a location of a target pixel in a reference image from a reference point of the reference image.

5. The method of claim 2, wherein the U correction value is based on a maximum correction limit and a minimum correction limit.

6. The method of claim 5, wherein the maximum correction limit and the minimum correction limit are user-selected.

7. The method of claim 5, wherein the maximum correction limit and the minimum correction limit are based on properties of the lens.

8. The method of claim 4, wherein the first distance value is calculated by assuming that target pixels in the reference image lie in a plurality of concentric rings emanating from the reference point of the reference image.

9. The method of claim 4, wherein the first distance value is calculated by first distance value=Root (Dx*Dx+Dy*Dy)*NormalizeValue, wherein:

$Dx = abs(HalfX - x + XSHIFT);$ $Dy = abs(HalfY - y + YSHIFT);$

XSHIFT represents a first distance in an X direction between the target pixel and a center of the image data along the X direction;

YSHIFT represents a second distance in a Y direction between the target pixel and the center of the image data along the Y direction;

HalfX is half a length of the reference image in the x direction; and

HalfY is half a width of the reference image in the y direction.

10. The method of claim 4, wherein the first distance value is calculated by assuming that target pixels in the reference image lie in a plurality of concentric rectangles emanating from the reference point of the reference image.

11. The method of claim 4, wherein the first distance value is calculated by first distance value=max (Dx,Dy)*NormalizeValue, wherein:

$Dx = abs(HalfX - x + XSHIFT);$ $Dy = abs(HalfY - y + YSHIFT);$

XSHIFT represents a first distance in an X direction between the target pixel and a center of the image data along the X direction;

YSHIFT represents a second distance in a Y direction between the target pixel and the center of the image data along the Y direction;

HalfX is half a length of the reference image in the x direction; and

HalfY is half a width of the reference image in the Y direction.

12. The method of claim 4, wherein the first distance value is calculated by assuming that target pixels in the reference image lie in a plurality of concentric rhombuses emanating from the reference point of the reference image.

13. The method of claim 4, wherein the first distance value is calculated by first distance value)=(Dx+Dy)*NormalizeValue, wherein:

Dx=abs(HalfX−x+XSHIFT);
Dy=abs(HalfY−y+YSHIFT);

XSHIFT represents a first distance in an X direction between the target pixel and a center of the image data along the X direction;

YSHIFT represents a second distance in a Y direction between the target pixel and the center of the image data along the Y direction;

HalfX is half a length of the reference image in the x direction; and

HalfY is half a width of the reference image in the y direction.

14. The method of claim 4, wherein the first distance value is calculated by assuming that target pixels in the reference image lie in a plurality of concentric polygons emanating from the reference point of the reference image, wherein the plurality of concentric polygons are substantially ring-shaped.

15. The method of claim 4, wherein the first distance value is calculated by

```
If (Dx > (Dy<<2))
then,
    Function_Distance(x,y) = ( Dx + Dy +max(Dx , Dy) + (abs(Dx − (Dy<<2))>>3))) * NormalizeValue
Else If (Dy > (Dx<<2))
then,
    Function_Distance(x,y) = (Dx + Dy +max(Dx , Dy)+ (abs(Dy − (Dx<<2))>>3)) * NormalizeValue
Else If (max(Dx,Dy) > (abs(Dx−Dy)<<2))
then,
    Function_Distance(x,y) = (Dx + Dy +max(Dx , Dy) + (max(Dx,Dy) − (abs(Dx−Dy)<<2)>>3) ) * NormalizeValue
Else,
    Function_Distance(x,y) = (Dx + Dy +max(Dx , Dy) ) * NormalizeValue
``` wherein:

$Dx = abs(HalfX - x + XSHIFT);$ $Dy = abs(HalfY - y + YSHIFT);$

"<<2" means multiply by 4 and ">>3" means divide by 8;

XSHIFT represents a first distance in an X direction between the target pixel and a center of the image data along the X direction;

YSHIFT represents a second distance in a Y direction between the target pixel and the center of the image data along the Y direction;

HalfX is half a length of the reference image in the x direction; and

HalfY is half a width of the reference image in the y direction.

16. The method of claim 2, wherein the V correction value is based on a first distance value, wherein the first distance value is associated with a location of a target pixel in a reference image from a reference point of the reference image.

17. The method of claim 2, wherein the V correction value is based on a luminance parameter, wherein the luminance parameter is determined based on whether the Y component of the image processed YUV data falls within a pre-selected luminance range.

18. The method of claim 2, wherein the V correction value is based on a maximum correction limit and a minimum correction limit.

19. The method of claim 18, wherein the maximum correction limit and the minimum correction limit are user-selected.

20. The method of claim 18, wherein the maximum correction limit and the minimum correction limit are based on properties of the lens.

21. The method of claim 16, wherein the first distance value is calculated by assuming that target pixels in the reference image lie in a plurality of concentric rings emanating from the reference point of the reference image.

22. The method of claim 16, wherein the first distance value is calculated by first distance value=Root (Dx*Dx+Dy*Dy)*NormalizeValue, wherein:

$Dx=abs(HalfX-x+XSHIFT);$ $Dy=abs(HalfY-y+YSHIFT);$

XSHIFT represents a first distance in an X direction between the target pixel and a center of the image data along the X direction;

YSHIFT represents a second distance in a Y direction between the target pixel and the center of the image data along the Y direction;

HalfX is half a length of the reference image in the x direction; and

HalfY is half a width of the reference image in the y direction.

23. The method of claim 16, wherein the first distance value is calculated by assuming that target pixels in the reference image lie in a plurality of concentric rectangles emanating from the reference point of the reference image.

24. The method of claim 16, wherein the first distance value is calculated by first distance value=max (Dx,Dy) *NormalizeValue, wherein:

$Dx=abs(HalfX-x+XSHIFT);$ $Dy=abs(HalfY-y+YSHIFT);$

XSHIFT represents a first distance in an X direction between the target pixel and a center of the image data along the X direction;

YSHIFT represents a second distance in a Y direction between the target pixel and the center of the image data along the Y direction;

HalfX is half a Length of the reference image in the x direction; and

HalfY is half a width of the reference image in the y direction.

25. The method of claim 16, wherein the first distance value is calculated by assuming that target pixels in the reference image lie in a plurality of concentric rhombuses emanating from the reference point of the reference image.

26. The method of claim 16, wherein the first distance value is calculated by first distance value=(Dx+Dy)*NormalizeValue, wherein:

$Dx=abs(HalfX-x+XSHIFT); Dy=abs(HalfY-y+YSHIFT);$

XSHIFT represents a first distance in an X direction between the target pixel and a center of the image data along the X direction;

YSHIFT represents a second distance in a Y direction between the target pixel and the center of the image data along the Y direction;

HalfX is half a length of the reference image in the x direction; and

HalfY is half a width of the reference image in the y direction.

27. The method of claim 16, wherein the first distance value is calculated by assuming that target pixels in the reference image lie in a plurality of concentric polygons emanating from the reference point of the reference image, wherein the plurality of concentric polygons are substantially ring-shaped.

28. The method of claim 16, wherein the first distance value is calculated by

```
If (Dx > (Dy<<2))
then,
    Function_Distance(x,y) = ( Dx + Dy +max(Dx , Dy) + (abs(Dx − (Dy<<2))>>3))) * NormalizeValue
Else If (Dy > (Dx<<2))
then,
    Function_Distance(x,y) = (Dx + Dy +max(Dx , Dy)+ (abs(Dy − (Dx<<2))>>3)) * NormalizeValue
Else If (max(Dx,Dy) > (abs(Dx−Dy)<<2))
then,
    Function_Distance(x,y) = (Dx + Dy +max(Dx , Dy) + (max(Dx,Dy) − (abs(Dx−Dy)<<2)>>3) ) * NormalizeValue
Else,
    Function_Distance(x,y) = (Dx + Dy +max(Dx , Dy) ) * NormalizeValue
``` wherein:

$Dx=abs(HalfX-x+XSHIFT);$ $Dy=abs(HalfY-y+YSHIFT);$

"<<2" means multiply by 4 and ">>3" means divide by 8;

XSHIFT represents a first distance in an X direction between the target pixel and a center of the image data along the X direction;

YSHIFT represents a second distance in a Y direction between the target pixel and the center of the image data along the Y direction;

HalfX is half a length of the reference image in the x direction; and

HalfY is half a width of the reference image in the y direction.

29. The method of claim 2, wherein the Y correction value is based on a second distance value, wherein the second distance value is in turn based on a first distance and one or more luminance parameters based on an F value of the lens.

30. The method of claim 2, wherein the Y correction value is based on a smoothing parameter, wherein the smoothing parameter is user-selected based on a desired amount of smoothing.

31. The method of claim 2, wherein the Y correction value is based on a maximum correction limit and a minimum correction limit.

32. The method of claim 31, wherein the maximum correction limit and the minimum correction limit are user-selected.

33. The method of claim 31, wherein the maximum correction limit and the minimum correction limit are based on properties of the lens.

34. The method of claim 29, wherein the first distance value is calculated by assuming that target pixels in the reference image lie in a plurality of concentric rings emanating from the reference point of the reference image.

35. The method of claim 29, wherein the first distance value is calculated by first distance value=Root (Dx*Dx+Dy*Dy)*NormalizeValue, wherein:

$Dx=abs(HalfX-x+XSHIFT);$ $Dy=abs(HalfY-y+YSHIFT);$

XSHIFT represents a first distance in an X direction between the target pixel and a center of the image data along the X direction;
YSHIFT represents a second distance in a Y direction between the target pixel and the center of the image data along the Y direction;
HalfX is half a length of the reference image in the x direction; and
HalfY is half a width of the reference image in the y direction.

36. The method of claim 29, wherein the first distance value is calculated by assuming that target pixels in the reference image lie in a plurality of concentric rectangles emanating from the reference point of the reference image.

37. The method of claim 29, wherein the first distance value is calculated by
first distance value=max (Dx,Dy)*NormalizeValue, wherein:

$Dx=abs(HalfX-x+-XSHIFT);$ $Dy=abs(HalfY-y+YSHIFT);$

XSHIFT represents a first distance in an X direction between the target pixel and a center of the image data along the X direction;
YSHIFT represents a second distance in a Y direction between the target pixel and the center of the image data along the Y direction;
HalfX is half a length of the reference image in the x direction; and
HalfY is half a width of the reference image in the y direction.

38. The method of claim 29, wherein the first distance value is calculated by assuming that target pixels in the reference image lie in a plurality of concentric rhombuses emanating from the reference point of the reference image.

39. The method of claim 29, wherein the first distance value is calculated by first distance value=(Dx+Dy)*Normalize Value,
wherein:

$Dx=abs(HalfX-x+XSHIFT);$ $Dy=abs(HalfY-y+YSHIFT);$

XSHIFT represents a first distance in an X direction between the target pixel and a center of the image data along the X direction;
YSHIFT represents a second distance in a Y direction between the target pixel and the center of the image data along the Y direction;
HalfX is half a length of the reference image in the x direction; and
HalfY is half a width of the reference image in the y direction.

40. The method of claim 29, wherein the first distance value is calculated by assuming that target pixels in the reference image lie in a plurality of concentric polygons emanating from the reference point of the reference image, wherein the plurality of concentric polygons are substantially ring-shaped.

41. The method of claim 29, wherein the first distance value is calculated by

```
If (Dx > (Dy<<2))
then,
    Function_Distance(x,y) = ( Dx + Dy +max(Dx , Dy) + (abs(Dx − (Dy<<2))>>3))) * NormalizeValue
Else If (Dy > (Dx<<2))
then,
    Function_Distance(x,y) = (Dx + Dy +max(Dx , Dy)+ (abs(Dy − (Dx<<2))>>3)) * NormalizeValue
Else If (max(Dx,Dy) > (abs(Dx−Dy)<<2))
then,
    Function_Distance(x,y) = (Dx + Dy +max(Dx , Dy) + (max(Dx,Dy) − (abs(Dx−Dy)<<2)>>3) ) * NormalizeValue
Else,
    Function_Distance(x,y) = (Dx + Dy +max(Dx , Dy) ) * NormalizeValue
``` wherein:

$Dx=abs(HalfN-x+XSHIFT);$ $Dy=abs(HalfY-y+YSHIFT);$

"<<2" means multiply by 4 and ">>3" means divide by 8;
XSHIFT represents a first distance in an X direction between the target pixel and a center of the image data along the X direction;
YSHIFT represents a second distance in a Y direction between the target pixel and the center of the image data along the Y direction;
HalfX is half a length of the reference image in the x direction; and
HalfY is half a width of the reference image in the y direction.

42. A method for applying a lens correction to image data that is associated with a lens, the method comprising:
converting the image data to a YUV color space to form YUV image data, if the image data is not in the YUV color space;
applying image processing procedures to the YUV image data to form image processed YUV data; and applying the lens correction to the image processed YUV data, wherein applying the lens correction includes applying a V correction value to a V component of the image processed YUV data, the V correction value is based at least in part on a luminance parameter, and the luminance parameter is determined based on whether the Y component of the image processed YUV data falls within a pre-selected luminance range.

43. A method for applying a lens correction to image data that is associated with a lens, the method comprising:

converting the image data to a YUV color space to form YUV image data, if the image data is not in the YUV color space;

applying image processing procedures to the YUV image data to form image processed YUV data; and applying the lens correction to the image processed YUV data, wherein applying the lens correction includes applying a Y correction value to a Y component of the image processed YUV data, the Y correction value is based on a second distance value, wherein the second distance value is in turn based on a first distance and one or more luminance parameters based on an F value of the lens.

44. A method for applying a lens correction to image data that is associated with a lens, the method comprising:

converting the image data to a YUV color space to form YUV image data, if the image data is not in the YUV color space;

applying image processing procedures to the YUV image data to form image processed YUV data; and applying the Lens correction to the image processed YUV data, wherein applying the Lens correction includes applying a Y correction value to a Y component of the image processed YUV data, the Y correction value is based on a smoothing parameter, wherein the smoothing parameter is user-selected based on a desired amount of smoothing.

* * * * *